United States Patent

[11] 3,550,638

[72] Inventor Joseph B. Smith
c/o The Pipe Line Development Co., 1831 Columbus Road, Cleveland, Ohio 44113
[21] Appl. No. 746,162
[22] Filed July 19, 1968
Continuation-in-part of Ser. No. 608,090, Jan. 9, 1967, Patent No. 3,467,141.
[45] Patented Dec. 29, 1970

[54] REPAIR COUPLING WITH DEFORMABLE METAL SEAL
6 Claims, 6 Drawing Figs.
[52] U.S. Cl. .................................................. 138/99; 285/373
[51] Int. Cl. .................................................. F16l 55/16
[50] Field of Search .......................................... 138/97, 99; 277/226; 285/94, 373, 410, 411

[56] References Cited
UNITED STATES PATENTS
| Re.12,703 | 10/1907 | Corcoran | 138/99 |
| 377,130 | 1/1888 | White | 285/411 |
| 2,647,770 | 8/1953 | Tollefsbol | 277/226 |
| 2,721,581 | 10/1955 | Risley et al. | 138/97 |

FOREIGN PATENTS
| 763,665 | 12/1956 | Great Britain | 138/99 |

Primary Examiner—Fred C. Mattern, Jr.
Assistant Examiner—Richard J. Sher
Attorney—McNenny, Farrington, Pearne & Gordon ABSTRACT: A method and apparatus for the onsite sealing of leaking, flanged pipe joints. Curved body sections of a coupling are placed around the leaking flanged joint and are fastened at their ends to form a cylindrical coupling member about the joint. A deformable metal gasket for each abutting flange is provided within the curved body sections of the coupling to form a high temperature seal between these curved body sections and the periphery of the pipe flanged joint. These coupling member sections are initially formed out of round to effect a uniform mechanical seal about the periphery of the abutting flanges when these sections are drawn into a substantially cylindrical unit. A sealant is introduced under pressure into the zone defined by the cylindrical coupling member, the flanged joint, and the gasket means.

PATENTED DEC29 1970

INVENTOR
JOSEPH B. SMITH

BY
McNenny, Farrington, Pearne & Gordon

ATTORNEYS

INVENTOR
JOSEPH B. SMITH
BY
McNenny, Farrington, Pearne & Gordon
ATTORNEYS

REPAIR COUPLING WITH DEFORMABLE METAL SEAL

CROSS-REFERENCES TO RELATED APPLICATIONS

This application is a continuation-in-part of my application Ser. No. 608,090 filed Jan. 9, 1967, now Pat. No. 3,467,141 which shows, generally, the cylindrical coupling which is included in the improvement of the present invention.

BACKGROUND OF THE INVENTION

This invention relates to pipe couplings for sealing off leaks in pipes between abutting flanges and, more particularly, to a pipe coupling which may be applied onsite to a leaking pipe without shutting off the flow within the pipe while such repairs are being made. Many techniques have been proposed for the onsite sealing of a leaking joint. One such technique involves the step of completely surrounding the joint with a cementitious, moldable substance which is molded about the entire joint and portions of the adjacent pipes. Such a technique, however, forms a seal which is difficult to break when the joined pipes are to be replaced. Moreover, it is difficult, if not impossible, according to these techniques to apply the moldable substance about joints having high pressure and/or temperature leaks.

Because of the difficulties involved in applying a moldable substance to such a leaking pipe joint, it has been proposed to seal such joints by mechanical coupling means. One such coupling means is shown in my prior U.S. Pat No. 3,017,204. In my prior patent, a split coupling is disclosed which effectively seals a joint formed by axially butted pipes such as those that have been split or broken. The split coupling circumferentially seals both ends of the coupling against axial leakage along the pipe and thereby effectively seals the joint. It will be seen that the invention herein can be employed in application of the type disclosed in U.S. Pat. No. 3,017,204.

It is particularly difficult to seal a bolted flange type pipe joint, since such a joint has leakage paths which not only comprise the circumferential butt seam between the flanges but also include the zones between each flange bolt and its bolt hole. Heretofore, leaking flange joints have been sealed by completely surrounding the flange joint with a moldable substance but, as was previously indicated, such an operation forms a seal which is difficult to remove in the event that a pipe section is to be replaced. As was also indicated, it is substantially impossible to mold such substances over a flange which is leaking high temperature and/or pressure fluid. Even in those situations involving a low pressure and/or temperature fluid leak, it is frequently impossible to encase the pipe flanges with a moldable sealant due to space limitations which prevent encasement of the flange and flange bolts. It has been proposed to seal leaking flanged pipe joints by blocking off the area surrounding a flange bolt which is adjacent to the leak and then forcing a fluid sealant between a flange bolt and its bolt hole and into the leaking area between the pipe flanges. Although this technique has been partially successful, it involves forcing the fluid sealant in countercurrent relationship with respect to the leaking fluid and, in many instances, does not entirely seal the leak path.

Accordingly, I have shown in my copending application, Ser. No. 608,090, a new and improved method and apparatus for sealing leaking flanged pipe joints wherein a coupling is disclosed in which it is practical to initially block off the zone between two abutting flanges into which a fluid sealant is pumped. While the method described in the pending application is a substantial improvement, the apparatus is limited in operating temperature range.

While tubular metallic pipe seals have been employed in the past for high temperature environments, they have been used principally as primary seals of the type mentioned in U.S. Pat. No. 2,647,770 in combination with fully circular couplings. Such couplings of the metal ring type have limitations and are not adaptable to an onsite repair of leaking flange pipe joints where it is necessary to effect such repairs while the pipe is in service.

The prior art attempts to seal flanged pipe joints have been inspired by the dilemma involved where such a pipe joint is leaking. Plant maintenance personnel could, of course, repair such a leak by dismantling the flange coupling, replacing the gasket, and performing other necessary repair work. However, such an operation would require shutdown of the pipe line and, consequently, a possible shutdown of the entire plant. In addition, in high temperature lines, cooling due to shutdown will often cause additional leaks at other joints in the line. It is less expensive, therefore, to tolerate the leak until the normal maintenance shutdown of the plant. The plant, therefore, may tolerate fluid loss through leaking pipe joints, which may cost hundreds of dollars per day, rather than shutting down the plant, which may involve hundreds of dollars per hour.

When such leaking joints are repaired during the normal maintenance shutdowns, it is often found that the leaking fluid has eroded large portions of the mating flanges so that the entire assembly must be replaced.

SUMMARY

This invention overcomes many of these prior art problems by providing a pipe repair coupling suitable for high temperature applications which may be applied onsite to a leaking flanged pipe joint in, for example, a heat exchanger to stop the leak until the pipe joint may be repaired during normal maintenance shutdowns such that the operation of the entire installation is not curtailed.

It is a further object of this invention to provide a high temperature mechanical sealing means for initially blocking off the circumferential zone where bolted, flanged pipes are abutted and which will permit the introduction of a suitable fluid sealant under pressure within that zone.

It is an important object of this invention to provide a pipe coupling having a deformable metal sealing ring means in combination with curved support sections which are formed with a radius to conform at each section midportion or apex to the major diameter of the pipe joint flange and with slightly increasing radius towards the section ends, which sections when joined over the pipe joint flange become substantially cylindrical.

It is a further object to provide a structure and means for sealing a leak of fluid from a line having a temperature range of from room temperature to 2500° F.

It is a further object of this invention to provide a method which will facilitate the onsite sealing of flanged joints which may be leaking high pressure and/or temperature fluid.

It is another important feature of this invention to provide means for protecting metal sealing rings in a repair coupling against fluids which corrode metals such as copper, aluminum, or steel and which may be present in a line to be repaired by the coupling. The selection of a compatible plugging agent in accordance with this invention greatly extends the effective life of the coupling.

BRIEF DESCRIPTION OF THE DRAWINGS

FIG. 5 is a perspective view of one end of one portion of the repair coupling shown in FIG. 1.

DESCRIPTION OF THE PREFERRED EMBODIMENT

Figure 1:
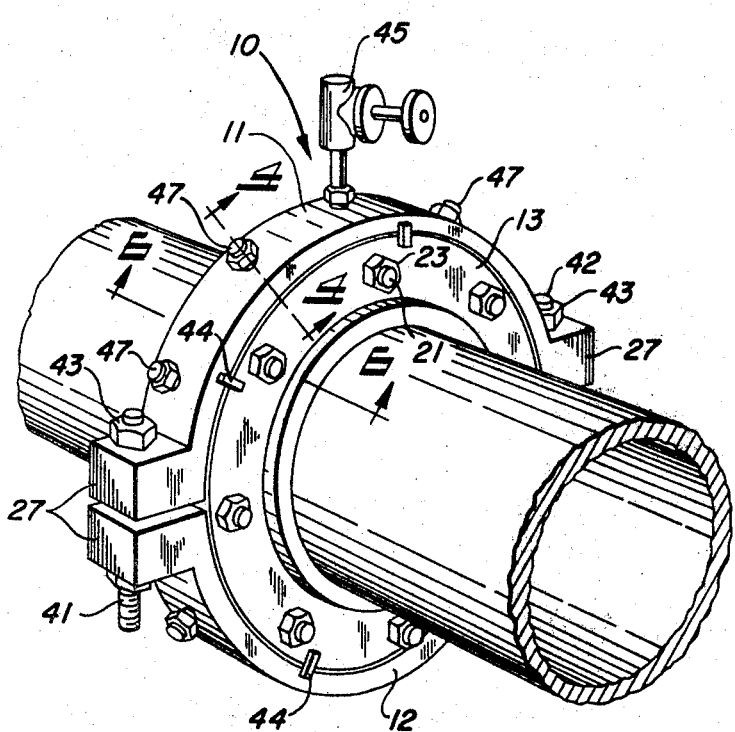
FIG. 1 is a perspective view of a repair coupling means in accordance with this invention, showing the coupling installed on a flanged and bolted pipe coupling.
Figure 2:
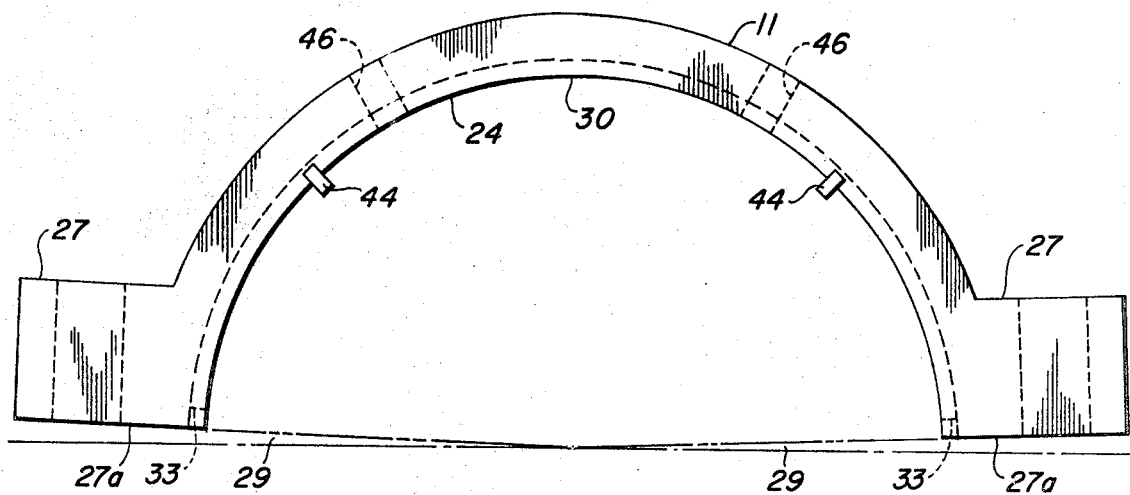
FIG. 2 is an elevational view of one portion of the repair coupling shown in FIG. 1, showing that portion disassembled from the flanged pipe coupling.
Figure 3:
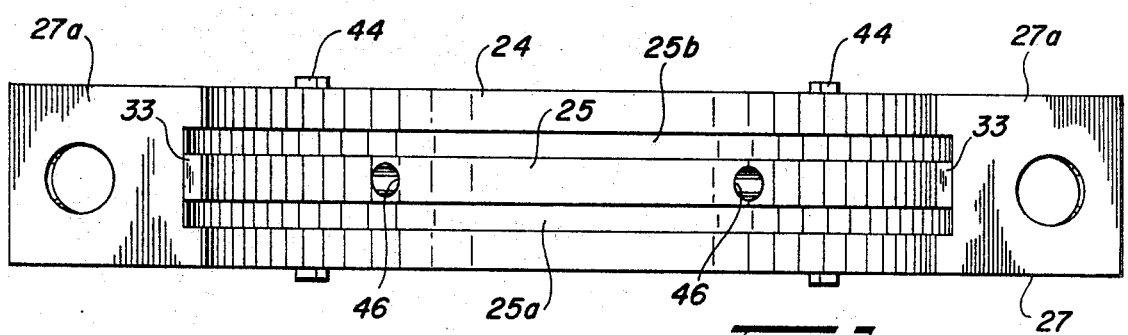
Figure 6:
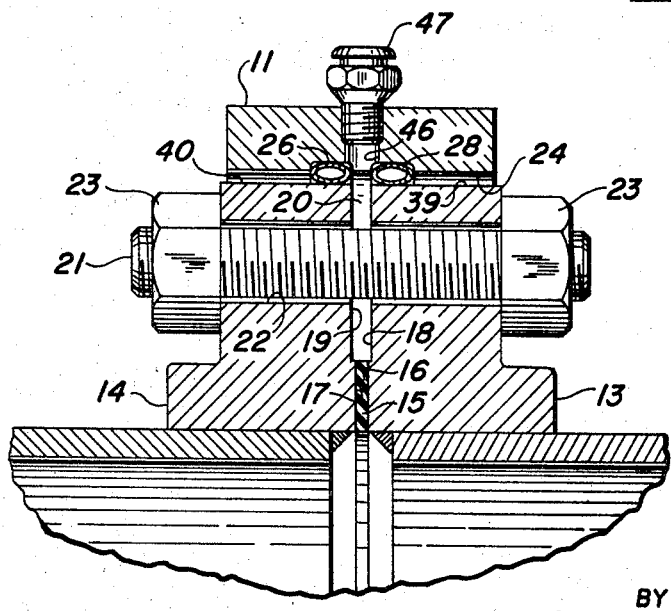
FIG. 6 is a fragmentary cross-sectional view, the plane of the section being indicated by the line 6—6 in FIG. 1.

Referring now to the drawings, a cylindrical sealing and repair coupling 10 is illustrated in FIG. 1. The repair coupling 10 includes upper and lower semicylindrical sections 11 and 12 respectively. The semicylindrical sections 11 and 12 are substantially identical and one of the sections (the upper section 11) will be described later in detail.

The repair coupling 10 is intended to seal a leaking flanged coupling formed by abutting pipe flanges 13 and 14. The pipe flanges 13 and 14 are ASA raised face flanges which capture a gasket 15 between opposed raised faces 16 and 17. The flanges 13 and 14 further include recessed faces 18 and 19 respectively which define an annular zone or space 20 between those flanges.

A multiplicity of threaded studs 21 extend through a corresponding multiplicity of bores 22 and span the zone 20. Each threaded stud 21 is provided with a nut 23 at each projecting end so that, when the nuts 23 are tightened, the joint flanges 13 and 14 will compress the gasket 15 between the opposed raised faces 16 and 17.

Leakage through the gasket 15, upon failure of that gasket, will cause fluid flow primarily radially outwardly through the zone 20. This flow is arrested by the semicylindrical sections 11 and 12 in a manner which will hereinafter become apparent with reference to the section 11.

Figure 4:
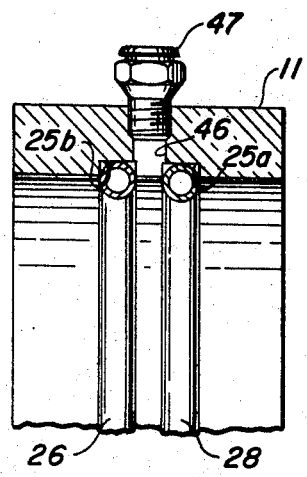
FIG. 4 is a fragmentary cross-sectional view, the plane of the section being indicated by the line 4—4 in FIG. 1.
Figure 3:
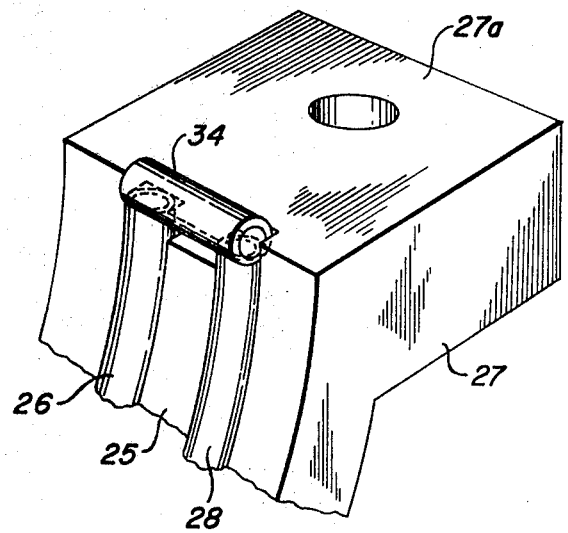
FIG. 3 is a plan view of the repair coupling portion illustrated in FIG. 2, with sealing gasket sections removed for clarity.

As may be seen in FIGS. 2—6, the section 11 has a semicylindrical inner face 24 which is provided with a pair of arcuately extending grooves 25a and 25b. The grooves 25a and 25b define an arcuately extending, central land 25. A deformable tubular metal gasket section 26 is provided within the groove 25a and extends along the entire extent of that groove section and, as may be seen most clearly in FIG. 5, each end terminates slightly below a pair of coupling flange faces 27a of a pair of end coupling flanges 27. Similarly, a deformable tubular metal gasket section 28 is arranged in the groove 25b and extends along the entire extent of that groove and terminates just below the faces 27a, its end being coplanar with the ends of the gasket 26. The depth of grooves 25a and 25b is such that the axial center lines of tubular gaskets 26 and 28 are held above the surface of semicylindrical inner faces 24 as seen in FIG. 4 to provide a proportionately large sealing area on outer cylindrical faces 39 and 40.

Both ends of land 25 terminate below each face 27a thus providing a cross recess 33 (FIG. 3) communicating with grooves 25a and 25b. This cross recess is adapted to position cross or end blocking metal gasket 34 of the same type as gaskets 26 and 28.

The semicylindrical sections 11 and 12 are applied around outer cylindrical faces 39 and 40 of the flanges 13 and 14 respectively and the semicylindrical sections 11 and 12 are fastened together to form the cylindrical repair coupling 10 by threaded end flange studs 41 and 42 and by nuts 43.

As the semicylindrical sections 11 and 12 are drawn together to form the cylindrical repair coupling 10, they are guided into axial alignment with the outer surfaces 39 and 40 of the flanges 13 and 14 by a plurality of locating lugs 44 which are welded around the periphery of the ends of the semicylindrical sections 11 and 12. The locating lugs 44 are particularly useful during the initial placement of relatively large and heavy semicylindrical sections about a flanged coupling, and are also useful in those situations where large amounts of high pressure fluid are escaping from the faulty pipe joint. In those latter instances the repairmen may have difficulty visually aligning the semicylindrical sections with the flanged joint.

During installation semicylindrical sections 11 and 12 are drawn together by tightening nuts 43 on stud 41 against flanges 27. To prevent deformation of the tubular gaskets at the flanges 27 when the coupling is placed on the pipe joint and to effect a more uniform contact pressure along the full length of gaskets 26 and 28, the semicylindrical sections 11 and 12 are formed slightly out of round or sprung as indicated by the angle 29. The clearance between the ends of gaskets 26 and 28 and outer surfaces 39 and 40 resulting from the initial out of round condition of semicylindrical sections 11 and 12 assures full contact pressure between the gaskets 26 and 28 and outer cylindrical faces 39 and 40 at the midportion or apex 30 of the gasket arc sections. Further tightening of nuts 43 progressively closes angle 29 until the ends of gaskets 26 and 28 are forced against outer surfaces 39 and 40.

Under clamping forces developed by tightening nuts 43, gaskets 26 and 28 plastically deform progressively from the apex to the flange portions of the coupling to conform to the joint flange while accommodating slight variations in the surfaces 39 and 40 and slots 25a and 25b to effectively seal the zone 20 against radial leakage. Such radial leakage is further eliminated between the faces 27a of the cooperating flanges 27 since each gasket 34 cooperates with an opposite gasket 34 (not shown) to seal off any possible leakage between flanges.

Gaskets 26, 28 and 34 are, preferably, of steel tubular stock, hollow in cross section. Rubberlike or elastomeric material becomes ineffective as gasket materials between 250° F. and 500° F. depending upon the particular gasket composition. If the gasket is to be heated to a temperature of about 900° F., an asbestos-mica composition may be employed. The preferred deformable, nonresilient hollow metallic gaskets may be used in these lower temperature ranges; but they are particularly effective at temperatures above 1000° F. and especially from 1500° F. to 2500° F. at pressures in excess of 1000 p.s.i. The particular composition of the gaskets 26, 28 and 34 depends upon the material carried in the pipe and the temperature of that material. Ductile, nonresilient metals such as copper, aluminum, and high temperature low-creep steel may be used. The metal gaskets of low-creep steel are preferred in most applications. In this instance the tubing is welded in the channels 25a, 25b, 33 and 33'. When copper and aluminum are used the gaskets 26, 28 and 34 are brazed in place.

With the semicylindrical sections drawn into sealing engagement with the faces 39 and 40 (FIG. 6) any leakage through the gasket 15 flows in the zone defined by the bolt hole 22 and the threaded stud 21. In the event that the gasket 15 is particularly faulty, it may be necessary to provide a relief valve 45 in one of the sections 11 and 12. The relief valve, when opened, provides an escape path for the fluid during the previously described assembly of the sections 11 and 12 about the flanged coupling.

A plurality of openings 46 are drilled radially through the sections 11 and 12. The valve 45 is initially threaded into one of the openings 46 and each other opening 46 is provided with a one-way check valve fitting 47. Each fitting 47 is similar to a conventional grease fitting so that a hand grease gun may be connected to such fittings.

To seal off any axial leakage in the zone between each threaded stud 21 and its bore 22 a hand grease gun (not shown) is filled with a suitable sealant and the nozzle of the gun is connected to a fitting 47. The hand gun should develop a pressure which is sufficient to overcome the pressure within the zone 20 so that the sealant will be forced into that zone. When the sealant reaches the zone defined by the threaded stud 21 and its hole 22, it will encounter a pressure drop due to the axial flow of leaking fluid through this zone. The sealant will thereby be carried along with the leaking fluid to surround the threaded stud 21 and to thereby seal off any axial leakage about that stud. When the operator notes the cessation of axial fluid leakage from the studs 21 which are adjacent the fitting 47 through which the sealant is being pumped, he removes the nozzle of the hand gun from that fitting and connects the gun nozzle to another fitting. The operation is repeated until there is no leakage from the flanged joint. As a result of the sealing operation, the entire zone 20 may be filled with sealant and this filled zone may act as a reservoir for possible future leakage along the threaded studs 21. The repair coupling 10 may be left in place to seal the flanged joint until the joint may be repaired during the next scheduled plant shutdown. The sections 11 and 12 may be removed and reused for future repairs.

The sealant employed in the above-described sealing operation may comprise a high temperature sealing compound, such as Copaltite, a retarded thermosetting compound, available from National Engineering Products, Inc. Washington, D.C., for environments having temperatures between about 315° F. and 1500° F. In some instances, especially those of high environmental range, it may be desirable to inject a resin as a sealant such as a silicone for temperatures up to 1000° F., although the more commonly used silicones are limited to 500° F.

For temperatures above 1000° F. when high pressures are present it is possible to use in situ molding of cermoplastics such as those of the synthetic mica type having glass borders. in addition asphalt filled with glass, mica and boron carbide may be used for even high temperatures and pressure. In such cases it may be found desirable to insert an inner layer of boron carbide and cover it with an asphalt base sealant. At the higher temperature fittings 47 may be specially adapted so that a large aperture is provided internally threaded so that it may be closed by a conventional pipe plug.

After all, or substantially all, of the fittings 47 have been injected with sealant, the valve 45 is removed and replaced with a fitting 47; and that fitting may be supplied with sealant if necessary.

During the time that the repair coupling 10 surrounds the flanged joint, it may be necessary to supply further sealant to one or more of the fittings 47. it should be appreciated, however, that any such further sealing operations may be easily performed by using the aforementioned sealing gun.

The sealant employed not only prevents leakage from the flanged joint, but also insulates the gaskets 26, 28, and 34 against corrosive fluids carried in the pipe line.

It will be seen that by axially extending the length of the coupling halves and providing fastener along the length of the coupling halves, the invention herein may be employed as a coupling for split pipes without abutting joint flanges. Thus, the illustrated embodiment may be used to repair pipe splits and rust spots as well as sealing flanged pipe joints.

The invention is not restricted to the slavish imitation of each and everyone of the details set forth above. Obviously, devices may be provided which change, eliminate, or add certain specific details without departing from the scope of the invention.

I claim:

1. A repair coupling for sealing a pipe comprising a pair of half sections, each half section having a pair of radially extending end flanges adapted to receive fasteners which when tightened cause corresponding flanges of each half section to be pressed together to form a cylindrical sleeve around a pipe to be sealed, each half section being out of round and having its radius slightly increasing toward the end flanges and said end flanges being offset with respect to a diameter line perpendicular to said smallest radius such that upon the application of force when said fasteners are tightened the said half sections are drawn together to form said cylindrical sleeve as the internal radius of said half sections adjacent said end flanges progressively becomes substantially equal to said smallest radius, sealing means for said sleeve comprising for each half section a pair of circumferential annular grooves interconnected with a pair of longitudinal grooves, a plastically deformable nonresilient tubular metal gasket being fused in each of said circumferential grooves, and a plastically deformable nonresilient tubular metal gasket being fused in each of said circumferential grooves, and a plastically deformable nonresilient tubular metal gasket for a longitudinal groove in each of said half sections such that said circumferential metal gaskets are progressively plastically deformed to provide a pair of spaced peripheral seals about the pipe to be sealed as said fastener means are tightened.

2. A repair coupling according to claim 1 wherein said peripheral seals, said coupled half sections, and said pipe provides a closed boundary for a circumferential zone about said pipe, and a plurality of one way valved fittings are provided for each half section whereby sealant may be forced under pressure through said fittings into said zone and therefrom into a portion of said pipe to be sealed from which leakage is occurring and preventing leakage from said zone after said half sections have been coupled and after said sealant has been forced into said zone.

3. In flanged pipe joint assembly having a pair of flanges each of which include flange faces defining a joint between adjacent pipes, said joint being formed by first gasket means pressed between inter annular portions of said flange faces with the remainder of said flange faces spaced apart, a plurality of aligned fastener holes in each flange, said flange having a cylindrical outer surface, a fastener through each pair of aligned holes, and sealing means for sealing fluid leakage in said joint defined by said flanges and fluid leakage along zones defined by each fastener and each hole, said sealing means comprising a cylinder surrounding said cylindrical outer surface of each flange, second gasket means between said cylinder and the cylindrical outer surface of each flange on both sides of the space defined by said flanges, said second gasket means being compressed between an inner surface of said flanges and means for admitting pressurized fluid sealant to a zone defined by said cylinder, said first and second gasket means, said spaced apart flange faces and said holes, whereby said sealant may flow into a space between each fastener and each hole, the improvement wherein said second gasket means are a pair of plastically deformable nonresilient tubular metal gaskets fused in a corresponding pair of circumferential annular grooves in said cylinder, said cylinder comprising a pair of half sections, each half section having a pair of radially extending end flanges adapted to receive coupling fasteners which when tightened cause corresponding flanges of each half section to be compressed together to form said cylinder around said joint, each half section being out of round and having its smallest internal radius equidistant from each end flange and having its radius slightly increasing toward the end flanges, and said end flanges being offset with respect to a diameter line perpendicular to said smallest radius such that upon the application of force, when said coupling fasteners are tightened, the said half sections are drawn together to form said cylinder about said cylindrical outer surface of each flange and said second gasket means are progressively plastically deformed to provide a peripheral seal on both sides of said joint on the cylindrical outer surface on each of said flanges such that the internal radius of said half section adjacent said end flanges progressively becomes substantially equal to said smallest radius.

4. A flanged pipe joint assembly according to claim 3 including passage means through said cylinder providing a flow path for said fluid during application of said cylinder to said flange, said passage means having valve means to close said passage after said cylinder is applied to said flange.

5. A flanged pipe joint assembly according to claim 3 wherein each of said circumferential grooves have side walls lying in a radial plane and intersecting the inner surface of said half section to define an edge for each side wall, and said deformable metal gasket as it is progressively plastically deformed is pressed against said edges so that said side walls and said edges provide a bearing surface for said seal.

6. A method of sealing leaks in a flanged pipe joint having abutting flange faces defining a flange between adjacent pipes, said flange faces having holes therein, a plurality of aligned fastener holes in each of said flanges and a fastener through each pair of said aligned holes comprising the steps of applying a pair of half sections of the coupling member over a cylindrical outer surface of each flange, each of said half sections being out of round and having a pair of radially extending end flanges, each half section having a radius slightly increasing toward the end flanges and said end flanges being offset with respect to a diameter line perpendicular to the smallest radius of said half sections, each of said half sections having a metal seal corresponding to each flange of said flanged pipe joint, plastically deforming a portion of said metal seals and causing progressive plastic deformation of said seal whereby said seal is caused to progressively engage the cylindrical outer surface of the corresponding flange of said flanged pipe joint until said seal engages and surrounds said cylindrical surface and a zone is defined by said seals, said flanged pipe, the joint between said flanges, and said half sections, injecting sealant into said zone, said sealant being fluid at a temperature of at least 1,000° F. and a pressure of at least 1,000 p.s.i., such that at said temperature and pressure the internal pressure of said pipe joint causes sealant to be carried from said zone into a space between each aligned fastener and each corresponding aligned hole.